United States Patent
Saito

(10) Patent No.: US 10,804,548 B2
(45) Date of Patent: Oct. 13, 2020

(54) FUEL CELL SYSTEM AND HYDROGEN LEAK DECISION METHOD IN FUEL CELL SYSTEM

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 166 days.

(21) Appl. No.: 15/852,549

(22) Filed: Dec. 22, 2017

(65) Prior Publication Data

US 2018/0233755 A1 Aug. 16, 2018

(30) Foreign Application Priority Data

Feb. 10, 2017 (JP) ................................ 2017-022980

(51) Int. Cl.
*H01M 8/04089* (2016.01)
*H01M 8/043* (2016.01)
(Continued)

(52) U.S. Cl.
CPC ....... *H01M 8/04089* (2013.01); *H01M 8/043* (2016.02); *H01M 8/04097* (2013.01);
(Continued)

(58) Field of Classification Search
CPC ............. H01M 8/04089; H01M 8/043; H01M 8/04097; H01M 8/04388; H01M 8/04664; H01M 8/04679; H01M 8/04753
See application file for complete search history.

(56) References Cited

U.S. PATENT DOCUMENTS

| 2008/0220303 A1* | 9/2008 | Yoshida ............ H01M 8/04097 429/423 |
| 2009/0035612 A1 | 2/2009 | Suematsu et al. |
| 2016/0380284 A1 | 12/2016 | Okuyoshi et al. |

FOREIGN PATENT DOCUMENTS

| CN | 101194389 A | 6/2008 |
| CN | 100449840 C | 1/2009 |

(Continued)

*Primary Examiner* — Helen Oi K Conley
(74) *Attorney, Agent, or Firm* — Dickinson Wright PLLC

(57) ABSTRACT

A fuel cell system includes: a fuel cell; a hydrogen tank; a hydrogen supply flow path configured to connect the hydrogen tank and the fuel cell to each other; a valve element configured to, when closed, shut off supply of hydrogen from the hydrogen tank to the hydrogen supply flow path; a pressure sensor; a pressure reducer configured to reduce internal pressure of the hydrogen supply flow path; and a controller configured to decide presence or absence of a hydrogen leak in the fuel cell system upon a power-generation halt of the fuel cell. The controller: while closing the valve element, reduces the internal pressure of the hydrogen supply flow path to a first pressure value by the pressure reducer; after the pressure reduction to the first pressure value, decides presence or absence of a suspicion of a hydrogen leak by using a variation of a pressure value acquired from the pressure sensor; when deciding a suspicion of a hydrogen leak is presence, reduces the internal pressure of the hydrogen supply flow path to a second pressure value lower than the first pressure value by the pressure reducer; and after the pressure reduction to the second pressure value, decides the presence or absence of a hydrogen leak by using a variation of a pressure value acquired from the pressure sensor.

19 Claims, 9 Drawing Sheets

(51) Int. Cl.
*H01M 8/04664* (2016.01)
*H01M 8/0438* (2016.01)
*H01M 8/04746* (2016.01)
*H01M 8/0612* (2016.01)
*H01M 16/00* (2006.01)

(52) U.S. Cl.
CPC ... *H01M 8/04388* (2013.01); *H01M 8/04664* (2013.01); *H01M 8/04679* (2013.01); *H01M 8/04753* (2013.01); *H01M 8/0631* (2013.01); *H01M 16/006* (2013.01); *H01M 2250/20* (2013.01); *Y02B 90/10* (2013.01)

(56) References Cited

FOREIGN PATENT DOCUMENTS

| | | |
|---|---|---|
| CN | 100557876 C | 11/2009 |
| DE | 112006001673 T5 | 4/2008 |
| DE | 102016106795 A1 | 12/2016 |
| JP | 2006278088 A | 10/2006 |
| JP | 2007035445 A | 2/2007 |
| KR | 20170001599 A | 1/2017 |

\* cited by examiner

FUEL CELL SYSTEM AND HYDROGEN LEAK DECISION METHOD IN FUEL CELL SYSTEM

CROSS-REFERENCE TO RELATED APPLICATIONS

The present application claims priority to Japanese patent application 2017-22980 filed on Feb. 10, 2017, the entirety of the content of which is hereby incorporated by reference for all purpose.

BACKGROUND

Field

The present disclosure relates to a fuel cell system.

Related Art

As a fuel cell system in which hydrogen and oxygen are supplied to a fuel cell to perform power generation, there has been known a system for making a decision as to a leak of hydrogen gas to be supplied to the anode of the fuel cell (hereinafter, referred to as hydrogen leak). For example, JP 2007-035445 A discloses a system which is so designed that upon a halt of the fuel cell, a valve for shutting off supply of hydrogen from a hydrogen tank to a hydrogen supply flow path is closed to reduce internal hydrogen pressure of the hydrogen supply flow path, followed by making a hydrogen leak decision.

With the system described in JP 2007-035445 A, there have been cases heretofore in which after a hydrogen leak decision, opening the valve to start power generation by the fuel cell causes hydrogen to flow in the pressure-reduced hydrogen supply flow path, giving rise to loud noise. Accordingly, for the system adapted to make a hydrogen leak decision upon a halt of the fuel cell, there has been a desire for a technique capable of reducing noise involved in the opening of the shutoff valve after the hydrogen leak decision.

SUMMARY

According to one aspect of the disclosure, there is provided a fuel cell system. The fuel cell system include: a fuel cell; a hydrogen tank configured to store hydrogen therein; a hydrogen supply flow path configured to connect the hydrogen tank and the fuel cell to each other; a valve element configured to, when closed, shut off supply of hydrogen from the hydrogen tank to the hydrogen supply flow path; a pressure sensor for detecting an internal pressure value of the hydrogen supply flow path; a pressure reducer configured to reduce internal pressure of the hydrogen supply flow path; and a controller configured to decide presence or absence of a hydrogen leak in the fuel cell system upon a power-generation halt of the fuel cell, wherein the controller: while closing the valve element, reduces the internal pressure of the hydrogen supply flow path to a first pressure value by the pressure reducer; after the pressure reduction to the first pressure value, decides presence or absence of a suspicion of a hydrogen leak by using a variation of a pressure value acquired from the pressure sensor; when deciding that a suspicion of a hydrogen leak is presence, reduces the internal pressure of the hydrogen supply flow path to a second pressure value lower than the first pressure value by the pressure reducer; and after the pressure reduction to the second pressure value, decides the presence or absence of a hydrogen leak by using a variation of a pressure value acquired from the pressure sensor.

According to the above-described fuel cell system, when it is decided, after the internal pressure reduction of the hydrogen supply flow path to the first pressure value, that no suspicion of a hydrogen leak is presence, the pressure difference between the hydrogen tank and the interior of the hydrogen supply flow path becomes smaller than when the presence or absence of a hydrogen leak is decided after the internal pressure reduction of the hydrogen supply flow path to the second pressure value. Therefore, noise produced by the pressure difference can be reduced during opening of the valve element at a next start-up of the fuel cell.

DETAILED DESCRIPTION

A. First Embodiment

A1. Configuration of Fuel Cell System

Figure 1:
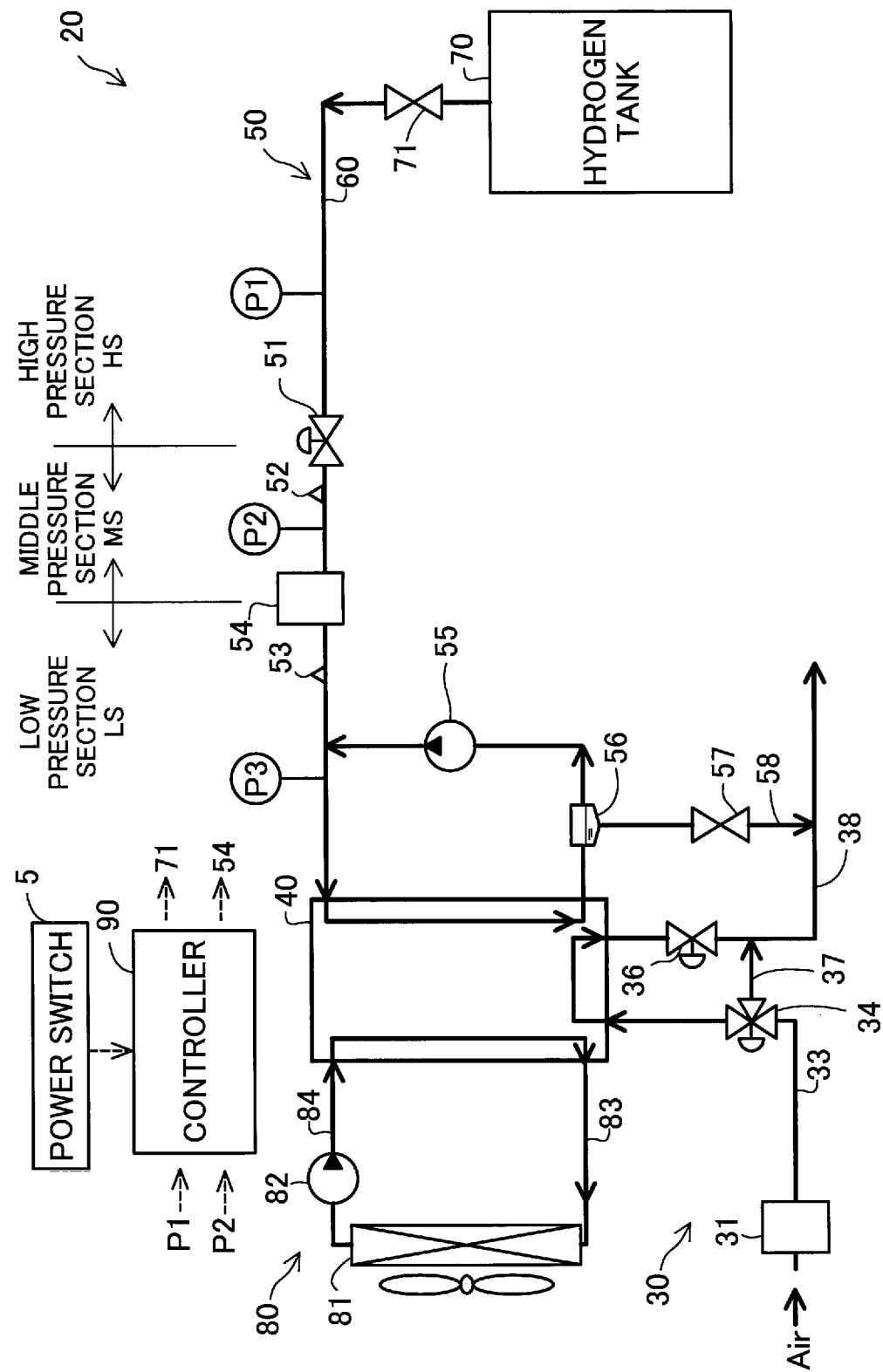
FIG. 1 is a diagram showing a schematic configuration of a fuel cell system.

FIG. 1 is a diagram showing a schematic configuration of a fuel cell system 20. The fuel cell system 20 is mounted on a vehicle as an example and, on request from a driver, outputs electric power functioning as a power source for the vehicle. The fuel cell system 20 includes a fuel cell stack 40 including a plurality of fuel cells, a hydrogen supply/discharge mechanism 50, an air supply/discharge mechanism 30, a cooling water circulation mechanism 80, and a controller 90. The fuel cell system 20 is started up by ON operation of a power switch 5, and halted by its OFF operation. The power switch 5, corresponding to an ignition switch in engine automobiles, serves as an input interface configured to switch between halted state and start-up state of the fuel cell system 20.

The hydrogen supply/discharge mechanism 50, which supplies and discharges hydrogen to and from the anode of the fuel cell stack 40, includes a hydrogen tank 70, a valve element 71, a hydrogen supply flow path 60, a regulator 51, a hydrogen pump 55, a gas-liquid separator 56, a drain water shutoff valve 57, a discharge flow path 58, an injector 54, relief valves 52, 53, a high-pressure-section pressure sensor P1, a middle-pressure-section pressure sensor P2, and a low-pressure-section pressure sensor P3. In the hydrogen supply/discharge mechanism 50, a range between the hydrogen tank 70 and the regulator 51 is referred to also as 'high pressure section HS,' a range between the regulator 51 and the injector 54 is referred to also as 'middle pressure section MS,' and a range extending from the injector 54 toward the fuel cell stack 40 is referred to also as a 'low pressure section LS.'

The hydrogen tank 70 is to store hydrogen therein. Stored in the hydrogen tank 70 is high-pressure hydrogen gas having a pressure of tens MPa. The hydrogen supply flow path 60 is piping configured to connect the hydrogen tank 70 and the fuel cell stack 40 to each other. The valve element 71 is a valve configured to shut off the supply of hydrogen from the hydrogen tank 70 to the hydrogen supply flow path 60, being referred to also as main stop valve. The valve element 71 is controlled for its opening and closing by the controller 90. When the valve element 71 is opened under control by the controller 90, hydrogen gas is supplied from the hydrogen tank 70 via the hydrogen supply flow path 60 to the fuel cell stack 40. When the valve element 71 is closed, the supply of hydrogen gas is shut off.

The regulator 51 regulates the pressure of hydrogen stored in the hydrogen tank 70 under control by the controller 90. The injector 54 injects hydrogen pressure-regulated by the regulator 51 toward the anode under control by the controller 90. When the injector 54 injects hydrogen toward the anode with the valve element 71 closed, hydrogen pressure in the hydrogen supply flow path decreases. The injector 54 is also referred to as 'pressure reducer.' Also, the injector 54 shuts off hydrogen to be supplied to the fuel cell stack 40 from part of the hydrogen supply flow path 60 ranging from the injector 54 toward the hydrogen tank 70 by stopping the injection under control by the controller 90. The injector 54 is also referred to as 'shutoff member.'

The gas-liquid separator 56 separates gas and liquid, from each other, discharged from the anode. The hydrogen pump 55 resupplies the gas separated by the gas-liquid separator 56 to the fuel cell stack 40. The gas separated by the gas-liquid separator 56 principally contains hydrogen discharged without being consumed, nitrogen having permeated from the cathode side through a membrane electrode assembly included in the fuel cell, and moisture content not having been separated by the gas-liquid separator 56. The discharge flow path 58 is piping for connecting the gas-liquid separator 56 and an air discharge flow path 38 (described later) included in the air supply/discharge mechanism 30 to each other. The drain water shutoff valve 57 is provided on the discharge flow path 58. The drain water shutoff valve 57 is opened to discharge liquid and nitrogen that have been separated by the gas-liquid separator 56. The quantity of hydrogen supply to the fuel cell stack 40 is adjusted by controlling the injector 54 and the drain water shutoff valve 57.

The high-pressure-section pressure sensor P1 detects a pressure of hydrogen within the hydrogen supply flow path 60 in the high pressure section HS. The middle-pressure-section pressure sensor P2 measures a pressure of hydrogen within the hydrogen supply flow path 60 in the middle pressure section MS. The low-pressure-section pressure sensor P3 measures a pressure (supply pressure) within the hydrogen supply flow path 60 in the low pressure section LS. The relief valves 52, 53 are opened under control by the controller 90 to release hydrogen into the atmospheric air.

The air supply/discharge mechanism 30, which supplies and discharges air to and from the cathode of the fuel cell stack 40, includes a compressor 31, an air supply flow path 33, a flow dividing valve 34, a pressure regulating valve 36, a bypass flow path 37, and an air discharge flow path 38.

The air supply flow path 33 is piping for connecting the fuel cell stack 40 and an atmospheric release port of the air supply flow path 33 to each other. The air discharge flow path 38 is piping for connecting the fuel cell stack 40 and an atmospheric release port of the air discharge flow path 38 to each other. The bypass flow path 37 is piping branched from a point of the air supply flow path 33 on the upstream side of the fuel cell stack 40 and connected to the air discharge flow path 38. The compressor 31 is provided at a point on the air supply flow path 33 to suck in and compress air from the atmospheric release port side of the air supply flow path 33. A position where the compressor 31 is provided is one closer to the atmospheric release port than to a connecting site of the air supply flow path 33 and the bypass flow path 37.

The flow dividing valve 34 is provided at the connecting site of the air supply flow path 33 and the bypass flow path 37 on the downstream side of the compressor 31, i.e. between the compressor 31 and the fuel cell stack 40, in the air supply flow path 33. The flow dividing valve 34 switches a direction of air flow, which comes up from the compressor 31, to either the fuel cell stack 40 side or the bypass flow path 37 side. Such a flow dividing valve 34 is also referred to as three-way valve. The bypass flow path 37 is piping for connecting the flow dividing valve 34 and the air discharge flow path 38 to each other. The pressure regulating valve 36 is provided on one side of the air discharge flow path 38 closer to the fuel cell stack 40 than the connecting site of the air discharge flow path 38 and the bypass flow path 37. The pressure regulating valve 36 regulates, depending on its degree of opening, a flow path cross-sectional area of the air discharge flow path 38. Air that has passed through the pressure regulating valve 36 passes through the connecting site with the bypass flow path 37, then being discharged into the atmospheric air through the atmospheric release port.

The cooling water circulation mechanism 80 configured to cool the fuel cell stack 40 includes a radiator 81, a cooling water pump 82, a cooling water discharge flow path 83, and a cooling water supply flow path 84.

The cooling water supply flow path 84 is a flow path for connecting the radiator 81 and the fuel cell stack 40 and also is piping for supplying cooling water to the fuel cell stack 40. The cooling water discharge flow path 83 is a flow path for connecting the fuel cell stack 40 and the radiator 81 and also is piping for discharging cooling water from the fuel cell stack 40. The cooling water pump 82 is provided at a point on the cooling water supply flow path 84 between the radiator 81 and the fuel cell stack 40 so that cooling water is circulated by the cooling water pump 82.

The controller 90 is configured as a computer including CPU, RAM and ROM, and specifically is an ECU (Electronic Control Unit). The controller 90 outputs signals configured to control operation of the fuel cell system 20. The controller 90, on receiving a power generation request, controls individual parts of the fuel cell system 20 to make the fuel cell stack 40 perform power generation. The controller 90 also controls individual parts of the fuel cell system 20 to acquire pressure values of hydrogen detected by the pressure sensors P1 to P3 and, by using variations of the acquired pressure values, perform a later-described hydrogen leak decision process.

Although depiction and detailed description are omitted, the fuel cell system 20 mounted on a vehicle further includes a secondary battery, and a DC/DC converter configured to control output voltage of the fuel cell stack 40 and charging/discharging of the secondary battery. The secondary battery stores electric power outputted by the fuel cell stack 40 as well as regenerative electric power, functioning as a power source together with the fuel cell stack 40.

A2. Hydrogen Leak Decision Process

Figure 2:
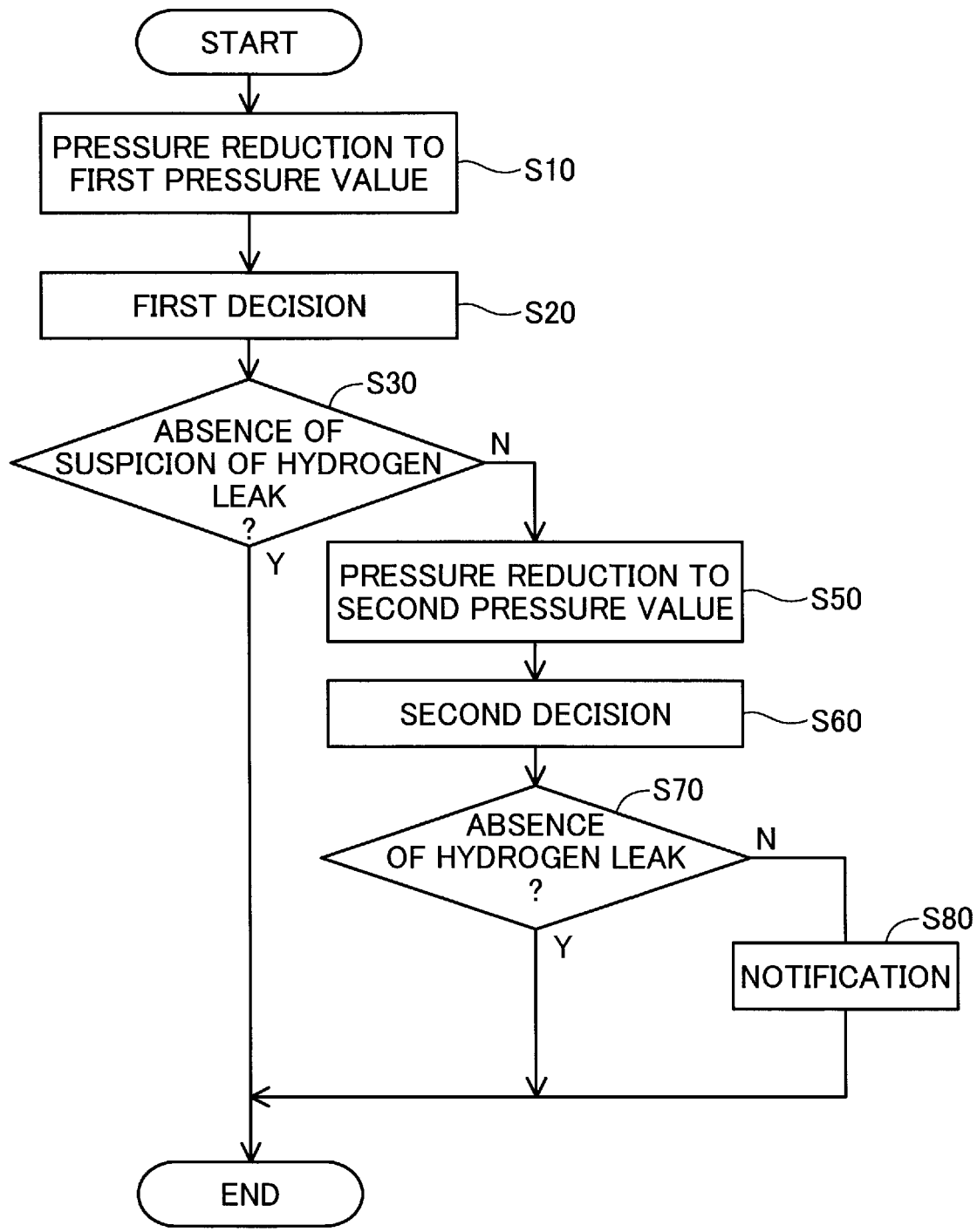
FIG. 2 is a flowchart showing a hydrogen leak decision process to be executed by the fuel cell system.

FIG. 2 is a flowchart showing a hydrogen leak decision process to be executed by the fuel cell system 20. The hydrogen leak decision process is a process configured to deciding presence or absence of a hydrogen leak in the fuel cell system 20 upon a power-generation halt of the fuel cell stack 40. In this embodiment, the hydrogen leak decision process is executed when a signal indicative of halting the fuel cell system 20 is inputted from the power switch 5 to the controller 90. In this embodiment, the fuel cell system 20 executes the hydrogen leak decision in the high pressure section HS and the middle pressure section MS.

In the hydrogen leak decision process, first, the controller 90 reduces internal pressure of the hydrogen supply flow path 60 to a first pressure value (FIG. 2; step S10). More specifically, the controller 90, while closing the valve element 71, controls the injector 54 to reduce the internal pressure of the hydrogen supply flow path 60 in the high pressure section HS and the middle pressure section MS. Thereafter, the controller 90 halts injection of the injector 54 to shut off hydrogen supplied to the fuel cell stack 40. The first pressure value is, for example, such a value that a pressure difference between the hydrogen tank 70 and the hydrogen supply flow path 60 of the high pressure section HS becomes about 2 MPa.

Next, the controller 90 executes a first decision for deciding presence or absence of a suspicion of a hydrogen leak by using variations of pressure values acquired from the pressure sensor P1, P2 (step S20).

Figure 3:
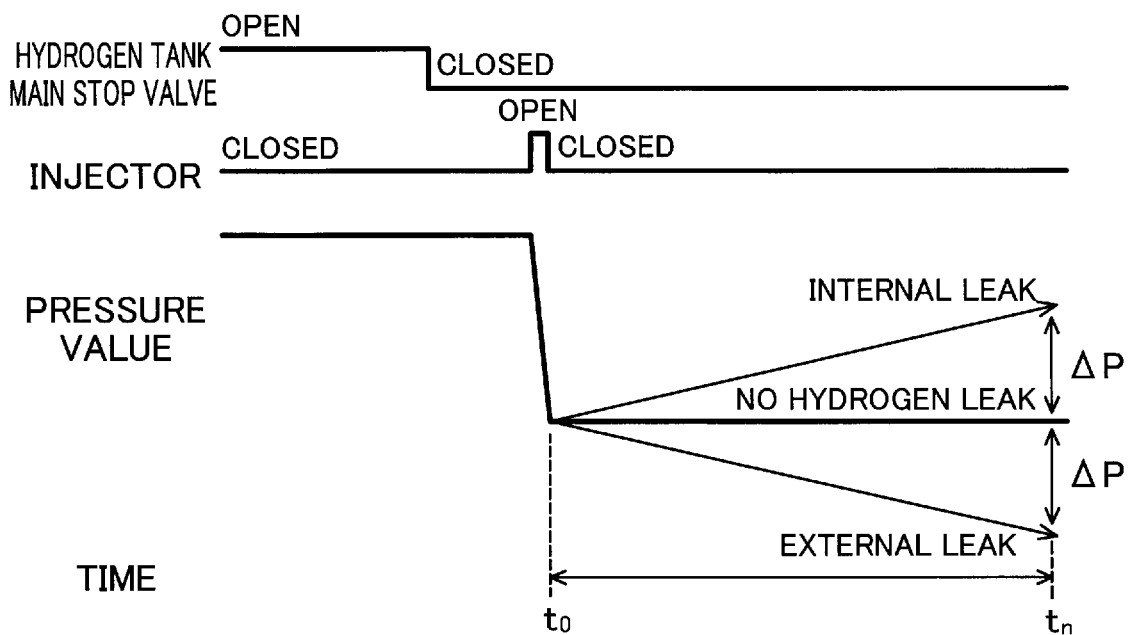
FIG. 3 is a time chart showing an image of the hydrogen leak decision process.

FIG. 3 is a time chart showing an image of the hydrogen leak decision process. Shown in FIG. 3 are an opening/closing state of the valve element 71, an opening/closing state of the injector 54, and a pressure value of the pressure sensors P1, P2. As the controller 90 closes the valve element 71 and turns the injector 54 into injection, the pressure value comes to the first pressure value at time $t_0$. With no occurrence of a hydrogen leak, the pressure value scarcely changes after decreasing to the first pressure value. With occurrence of a hydrogen leak, the pressure value increases or decreases from the first pressure value. For example, with occurrence of an internal leak, which is a hydrogen leak from the valve element 71 to the hydrogen supply flow path 60, the pressure value increases. With occurrence of an external leak, which is a hydrogen leak from the hydrogen supply flow path 60 to exterior of the hydrogen supply flow path 60, the pressure value decreases. Shown in FIG. 3 are a pressure-value increment ΔP and a pressure-value decrement ΔP resulting after a lapse of time $t_n$ subsequent to the pressure reduction to the first pressure value. Hereinbelow, ΔP will be also referred to as 'pressure-value variation.'

In this embodiment, with use of the pressure-value variation ΔP of interior of the hydrogen supply flow path 60 acquired from the pressure sensor P1, P2, the controller 90 calculates a hydrogen leak flow rate Q expressed by the following Equation (1):

$$Q=0.6 \times \Delta P \times V(Z/t) \qquad \text{Eq. (1)}$$

where Q is a hydrogen leak flow rate (L/min), ΔP is a variation (kPa) of the internal pressure value of the hydrogen supply flow path 60 after pressure reduction to the first pressure value, V is a volume (L) of the hydrogen supply flow path 60 whose pressure value is detected by the pressure sensor P1, P2, Z is a compressibility factor, and t is time (min). The controller 90 decides that no hydrogen leak is presence when the flow rate Q has come to a predetermined threshold $Q_{th}$ or lower. The threshold $Q_{th}$ is, for example, 1.4 (NL/min). In this embodiment, the controller 90 decides presence or absence of a hydrogen leak depending on absolute value of the hydrogen leak flow rate Q expressed by the foregoing Equation (1) with use of the pressure-value variation ΔP. It is noted that deciding the presence or absence of a hydrogen leak depending on the absolute value of the hydrogen leak flow rate Q means deciding the presence or absence of a hydrogen leak with use of the absolute value of the pressure-value variation ΔP.

As apparent from Equation (1), with the leak flow rate Q unchanged, the larger the volume V is, the smaller the pressure-value variation ΔP becomes. Since pressure sensors generally have measurement errors, it is hard, with a small pressure-value variation ΔP, to decide whether the pressure-value variation is attributable to a sensor error or to a hydrogen leak. Accordingly, in this embodiment, the hydrogen leak decision is executed based on the following concept so as not to be affected by errors of the pressure sensors.

Figure 4:
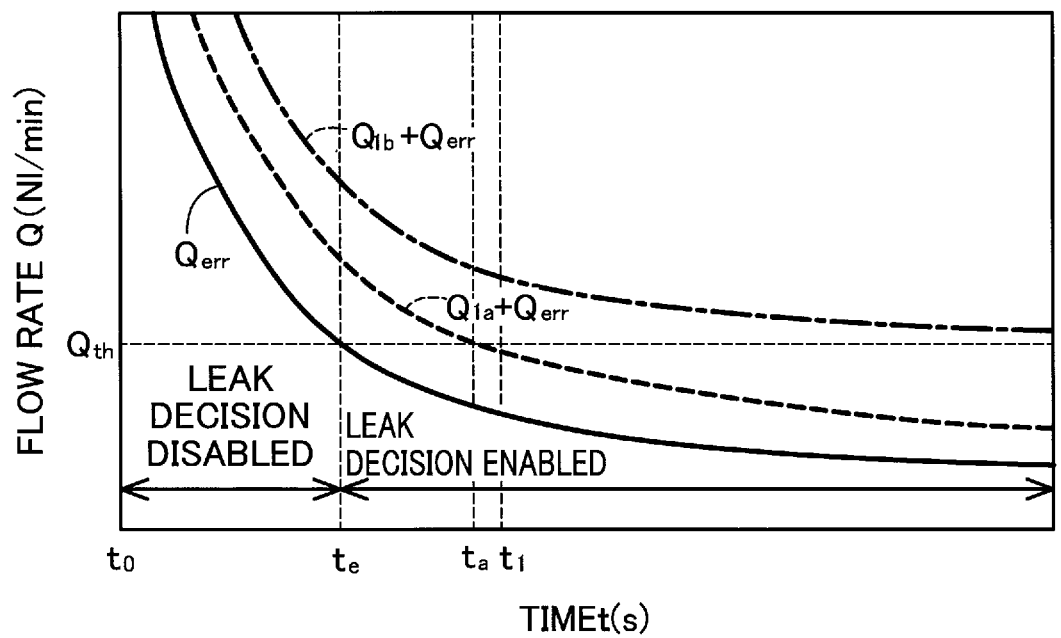
FIG. 4 is a chart showing a relationship between hydrogen leak flow rate and time.

FIG. 4 is a chart showing a relationship between hydrogen leak flow rate Q and time t. FIG. 4 gives leak flow rate Q in absolute value for convenience' sake. Time $t_0$ shown in FIG. 4 is a time at which interior of the hydrogen supply flow path 60 has come to the first pressure value. A sensor error-equivalent flow rate $Q_{err}$ shown in FIG. 4 is calculated by the following Equation (2):

$$Q_{err}=0.6 \times P_{err} \times V(Z/t) \qquad \text{Eq. (2)}$$

where $Q_{err}$ is a sensor error-equivalent flow rate (L/min), $P_{err}$ is a sensor error (kPa), V is a volume (L) of the hydrogen supply flow path 60 whose pressure value is detected by the pressure sensor P1, P2, Z is a compressibility factor, and t is time (min).

As apparent from Equation (2), since the sensor error-equivalent flow rate $Q_{err}$ decreases with time elapsing on, making a hydrogen leak decision without being affected by pressure-sensor errors is enabled when such a time is reached that the sensor error-equivalent flow rate $Q_{err}$ comes to the threshold $Q_{th}$ or lower. Therefore, the controller 90 calculates a sum value of a first hydrogen leak flow rate $Q_1$ calculated by Equation (1) and the sensor error-equivalent flow rate $Q_{err}$ (hereinafter, referred to as flow rate total value $Q_1+Q_{err}$) after a lapse of time t having elapsed since interior part of the hydrogen supply flow path 60 whose pressure value is acquired by the pressure sensor P1, P2 has been reduced to the first pressure value. Then, when the flow rate total value $Q_1+Q_{err}$ has come to the threshold $Q_{th}$ or lower before a lapse of a first decision time $t_1$, it is decided that there is no suspicion of a hydrogen leak.

In this embodiment, after a lapse of time $t_e$ at which the sensor error-equivalent flow rate $Q_{err}$ comes to the threshold $Q_{th}$ subsequent to the pressure reduction to the first pressure value, the controller 90 executes a first decision for deciding presence or absence of a suspicion of a hydrogen leak by the decision method described with reference to FIG. 4 (FIG. 2; step S20). When the flow rate total value $Q_1=Q_{err}$ has come to the threshold $Q_{th}$ or lower before a lapse of the first decision time $t_1$ subsequent to the pressure reduction to the first pressure value, the controller 90 decides that there is no suspicion of a hydrogen leak (FIG. 2; YES at step S30). The first decision time $t_1$ is, for example, a time length of 3 to 8 seconds. When the flow rate total value $Q_1+Q_{err}$ has converged to the threshold $Q_{th}$ or lower before the lapse of the first decision time $t_1$, the controller 90 terminates the hydrogen leak decision process at that time point without awaiting the lapse of the first decision time $t_1$. Therefore, when there has occurred no hydrogen leak with the first hydrogen leak flow rate $Q_1$ equal to 0, the hydrogen leak decision process is ended at time $t_e$.

A flow rate total value $Q_{1a}+Q_{err}$ shown in FIG. 4 has converged to the threshold $Q_{th}$ at time $t_a$ before a lapse of the first decision time $t_1$. In this case, the controller 90 decides at time $t_a$ that there is no suspicion of a hydrogen leak (FIG. 2; YES at step S30), ending the hydrogen leak decision process. A flow rate total value $Q_{1b}+Q_{err}$ shown in FIG. 4 has not converged to the threshold $Q_{th}$ before a lapse of the first decision time $t_1$. In this case, the controller 90 decides that there is a suspicion of a hydrogen leak (FIG. 2; NO at step S30).

Reverting to FIG. 2, with a suspicion of a hydrogen leak, the controller 90 controls the injector 54 to reduce the internal pressure of the hydrogen supply flow path 60 to a second pressure value lower than the first pressure value (step S50). After turning the injector 54 into injection so that the internal pressure of the hydrogen supply flow path 60 decreases to the first pressure value, the controller 90 stops the injection of the injector 54 so as to shut off hydrogen supplied to the fuel cell stack 40. The second pressure value is, for example, such a value that the pressure difference between the hydrogen tank 70 and the hydrogen supply flow path 60 of the high pressure section HS becomes about 10 MPa.

Next, with use of a variation of a pressure value acquired from the pressure sensor P1, P2, the controller 90 executes a second decision for deciding presence or absence of a hydrogen leak (FIG. 2; step S60). The controller 90 executes the second decision by the same concept as in the decision method described with reference to FIG. 4.

Figure 5:
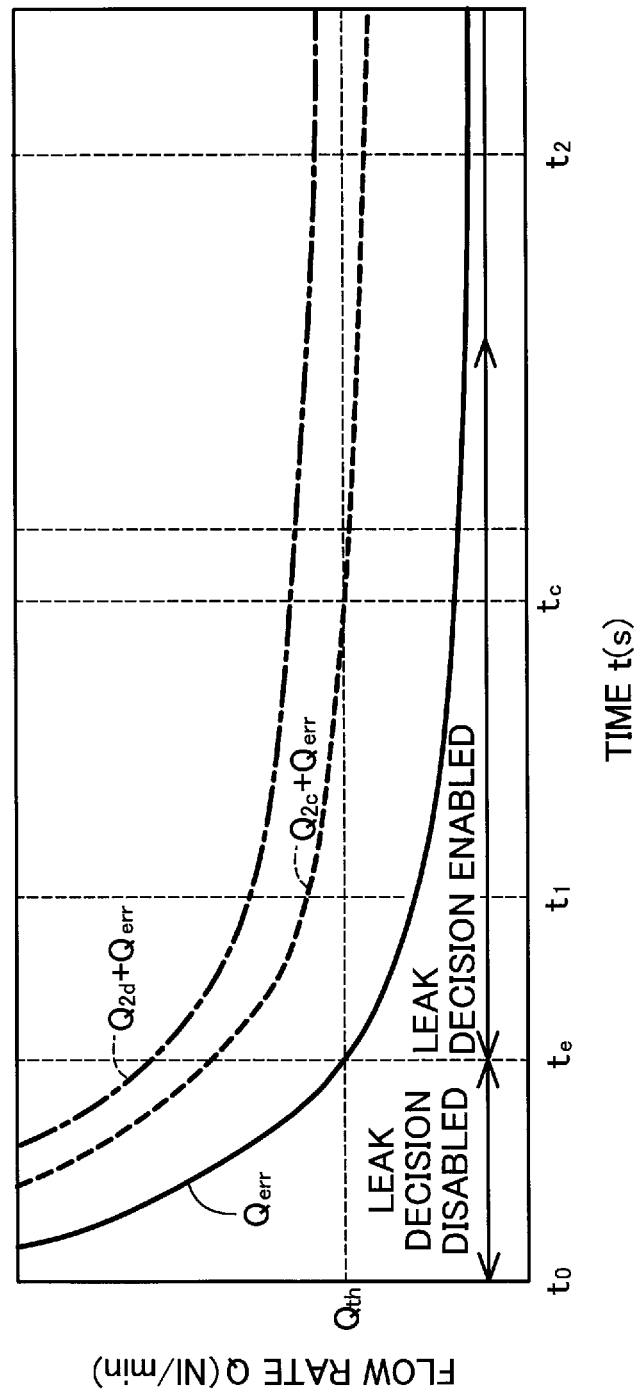
FIG. 5 is a chart showing a relationship between hydrogen leak flow rate and time in a second decision.

FIG. 5 is a chart showing a relationship between hydrogen leak flow rate Q and time t in the second decision. FIG. 5 gives leak flow rate Q in absolute value for convenience' sake. Time $t_0$ shown in FIG. 5 is a time at which the interior of the hydrogen supply flow path 60 has come to the second pressure value. The controller 90 calculates a flow rate total value $Q_2+Q_{err}$ of a second hydrogen leak flow rate $Q_2$ calculated by Equation (1) and the sensor error-equivalent flow rate $Q_{err}$ after a lapse of time t having elapsed since interior part of the hydrogen supply flow path 60 has been reduced to the second pressure value. Then, when the flow rate total value $Q_2+Q_{err}$ has come to the threshold $Q_{th}$ or lower before a lapse of the second decision time $t_2$ longer than the first decision time $t_1$, it is decided that there is no hydrogen leak (FIG. 2; NO at step S70), where the hydrogen leak decision process is ended. That is, when the flow rate total value $Q_2+Q_{err}$ has converged to the threshold $Q_{th}$ or lower before the lapse of the second decision time $t_2$, the controller 90 terminates the hydrogen leak decision process at that time point. The second decision time $t_2$ is, for example, a time length of 9 to 15 seconds. A flow rate total value $Q_{2c}=Q_{err}$ shown in FIG. 5 has converged to the threshold $Q_{th}$ at time $t_c$ before the lapse of the second decision time $t_2$. In this case, the controller 90 decides at time $t_c$ that there is no hydrogen leak (FIG. 2; YES at step S70), ending the hydrogen leak decision process. A flow rate total value $Q_{2d}+Q_{err}$ shown in FIG. 5 has not converged to the threshold $Q_{th}$ before the lapse of the second decision time $t_2$. In this case, the controller 90 decides that there is a hydrogen leak (FIG. 2; NO at step S70), and issues notification of occurrence of a hydrogen leak by means of warning display on an instrument panel or production of an alarm sound or the like (FIG. 2; step S80), then ending the hydrogen leak decision process.

A3. Effects

According to the fuel cell system 20 of this embodiment, when it is decided, after the internal pressure reduction of the hydrogen supply flow path 60 to the first pressure value, that there is no suspicion of a hydrogen leak, the pressure difference between the hydrogen tank 70 and the interior of the hydrogen supply flow path 60 becomes smaller than when the presence or absence of a hydrogen leak is decided after the internal pressure reduction of the hydrogen supply flow path 60 to the second pressure value. Therefore, noise produced by the pressure difference can be reduced during opening of the valve element 71 at a next start-up of the fuel cell.

Also according to this embodiment, since the second decision time $t_2$ is longer than the first decision time $t_1$, a variation of a pressure value at the second decision time $t_2$, with occurrence of a hydrogen leak, becomes larger than a variation of a pressure value at the first decision time $t_1$. Therefore, hydrogen-leak decision accuracy after the internal pressure reduction of the hydrogen supply flow path 60 to the second pressure value can be improved over decision accuracy after the pressure reduction to the first pressure value. Moreover, when it is decided, after the pressure reduction to the first pressure value, that there is no suspicion of a hydrogen leak, the time length until an end of the hydrogen leak decision can be shortened.

Also according to this embodiment, since the hydrogen leak decision can be executed regardless of sensor errors and the size of an area targeted for the hydrogen leak decision, the decision accuracy can be improved. Therefore, the extent of pressure reduction involved in the internal pressure reduction of the hydrogen supply flow path 60 to the first pressure value can be lessened, so that the pressure difference between the hydrogen tank 70 and the hydrogen supply flow path 60 can be lessened to more extent. Thus, when it is decided, after the pressure reduction to the first pressure value, that there is no suspicion of a hydrogen leak, noise produced by the pressure difference can be reduced to more extent during opening of the valve element 71 at a next start-up of the fuel cell.

Also according to this embodiment, the controller 90 executes a hydrogen leak decision within a range of the hydrogen supply flow path 60 from the hydrogen tank 70 to the injector 54 while hydrogen supplied to the fuel cell is shut off by the injector 54 provided on one side of the hydrogen supply flow path 60 closer to the fuel cell stack than the pressure sensors P1, P2. As a result, the hydrogen leak decision can be executed by eliminating the effects of cross leaks of hydrogen in the fuel cell, allowing the decision accuracy to be improved. Therefore, the extent of pressure reduction involved in the internal pressure reduction of the hydrogen supply flow path 60 to the first pressure value can be lessened, so that the pressure difference between the hydrogen tank 70 and the hydrogen supply flow path 60 can be lessened to more extent. Thus, when it is decided with the first pressure value that there is no suspicion of a hydrogen leak, noise produced by the pressure difference can be reduced to more extent during opening of the valve element 71 at a next start-up of the fuel cell.

A4. Modification of First Embodiment

In the second decision, the controller 90 may use positivity or negativity of a variation of a pressure value acquired from the pressure sensor P1, P2 to decide whether a hydrogen leak is an internal leak or an external leak. For example, the controller 90 may decide that there is an internal leak when a pressure value resulting after a lapse of the second decision time $t_2$ has increased to over the second pressure value. Conversely, when the pressure value resulting after the lapse of the second decision time $t_2$ has decreased to under the second pressure value, the controller 90 may decide that there is an external leak.

B. Second Embodiment

B1. Hydrogen Leak Decision Process

Figure 6:
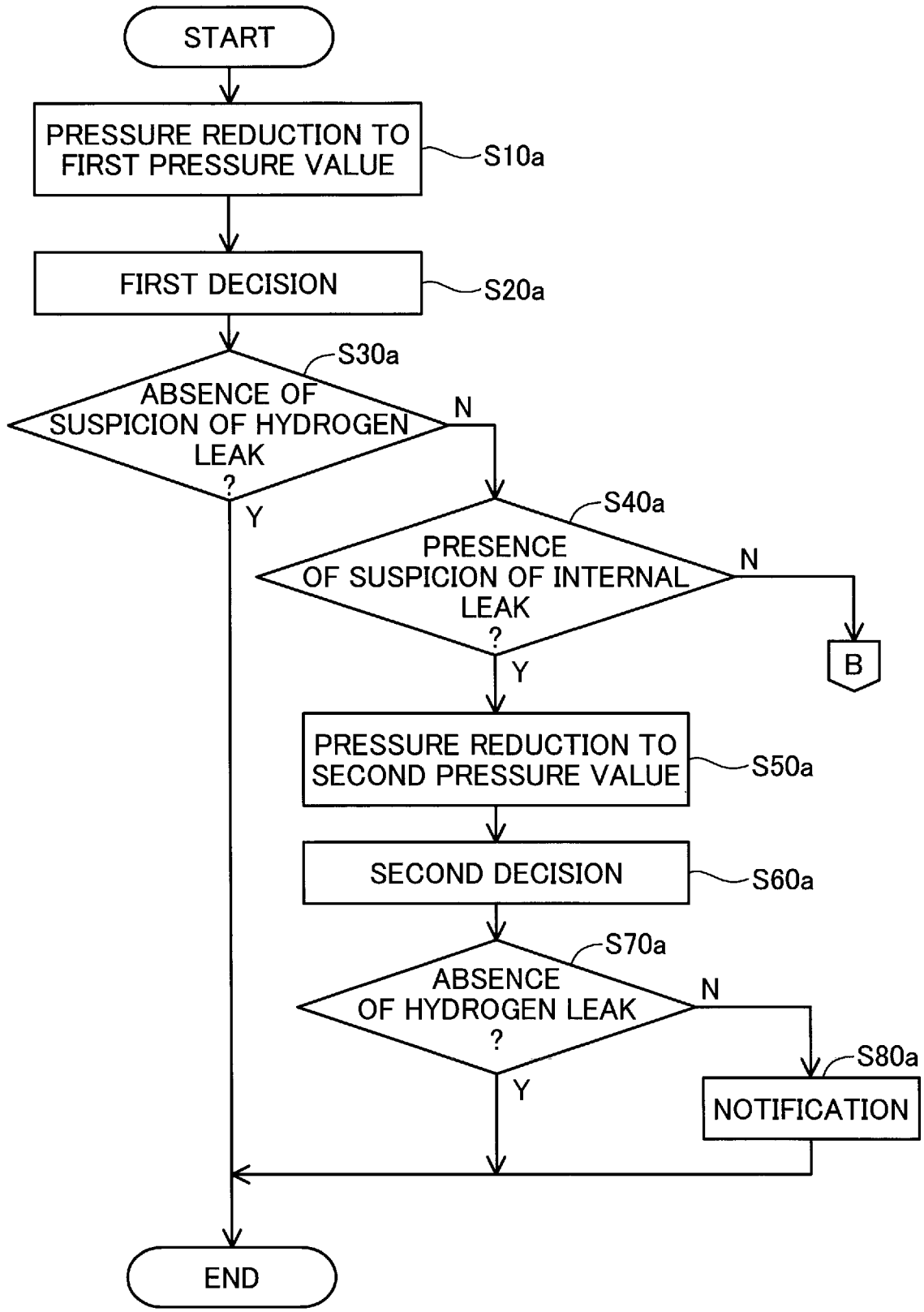
FIG. 6 is a flowchart showing a hydrogen leak decision process in a second embodiment.

FIG. 6 is a flowchart showing a hydrogen leak decision process in a second embodiment. Process contents of steps S10a to S30a and steps S50a to S80a of the hydrogen leak decision process shown in FIG. 6 are similar to those of steps S10 to S30 and steps S50 to S80 of the hydrogen leak decision process in the first embodiment shown in FIG. 2, and so their description is omitted.

In this embodiment, when there is a suspicion of a hydrogen leak (FIG. 6; NO at step S30a), the controller 90 decides, with use of a variation in an acquired pressure value, whether or not the suspicion of a hydrogen leak is a suspicion of an internal leak (FIG. 6; step S40a). Being a suspicion of an internal leak can be discriminated, for example, on the basis that a pressure-value variation ΔP at a lapse of the first decision time $t_1$ is positive.

Meanwhile, when the pressure-value variation ΔP is negative, the controller 90 decides that the suspicion of a hydrogen leak is a suspicion of an external leak (NO at step S40a).

Figure 7:
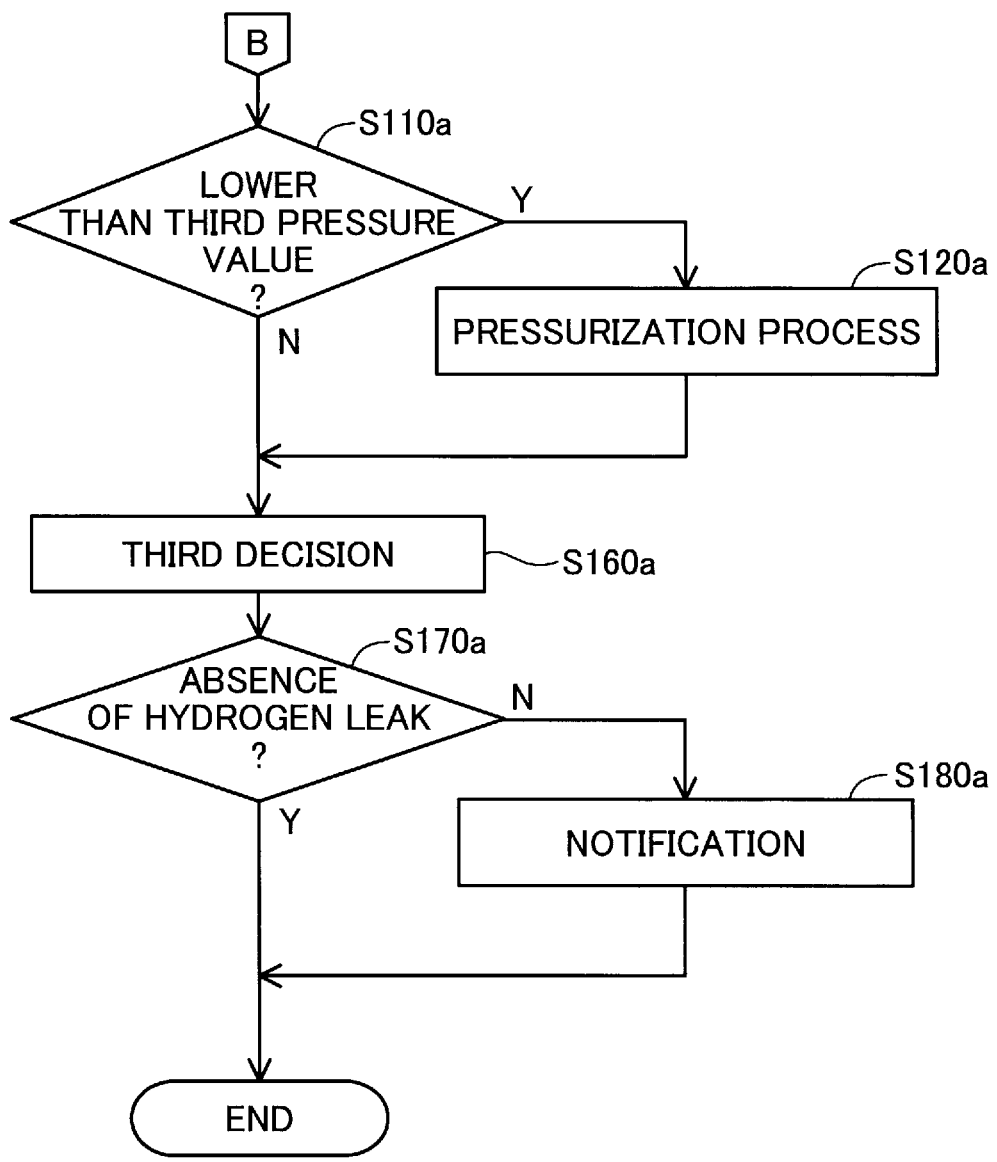
FIG. 7 is a flowchart showing a process to be executed by the fuel cell system when there is a suspicion of an external leak.

FIG. 7 is a flowchart showing a process to be executed by the fuel cell system 20 when there is a suspicion of an external leak. The controller 90 decides whether or not the internal pressure of the hydrogen supply flow path 60 is lower than a third pressure value (step S110a). The third pressure value is a pressure value which allows an external leak to be discriminated and which is a predetermined value. In this embodiment, the third pressure value is a value having a range, for example, a value within a range above about 40 MPa and below the pressure value of the hydrogen tank 70.

When the internal pressure of the hydrogen supply flow path 60 is lower than the third pressure value (YES at step S110a), the controller 90 controls the valve element 71 to supply hydrogen into the hydrogen supply flow path 60, thereby executing a pressurization process of pressurizing the interior of the hydrogen supply flow path to the third pressure value (step S120a). More specifically, the controller 90 opens the valve element 71 to pressurize the interior of the hydrogen supply flow path 60 of the high pressure section HS to the third pressure value, thereafter closing the valve element 71. As a result of the pressurization, the pressure difference between the hydrogen tank 70 and the hydrogen supply flow path 60 of the high pressure section HS is decreased.

When the internal pressure value of the hydrogen supply flow path 60 is equal to or higher than the third pressure value (NO at step S110a), or when the pressurization process is executed (step S120a), the controller 90 executes a third decision of deciding presence or absence of a hydrogen leak with use of a variation of a pressure value acquired from the pressure sensor P1, P2 (step S160a). The controller 90 decides the presence or absence of a hydrogen leak by the same concept as in the above-described second decision.

In the third decision, the controller 90 calculates a flow rate total value $Q_3+Q_{err}$ resulting from summing up a third hydrogen leak flow rate $Q_3$ and the sensor error-equivalent flow rate $Q_{err}$, the third hydrogen leak flow rate $Q_3$ being calculated by using Equation (1) and resulting after a lapse of time t having elapsed since the pressurization to the third pressure value. Then, when the flow rate total value $Q_3+Q_{err}$ has come to the threshold $Q_{th}$ or lower before a lapse of a third decision time $t_3$ longer than the first decision time $t_1$ since the pressurization to the third pressure value, the controller decides that there is no hydrogen leak (YES at step S170a), ending the hydrogen leak decision process. When the flow rate total value $Q_3+Q_{err}$ has converged to the threshold $Q_{th}$ or lower before the lapse of the third decision time $t_3$, the controller 90 terminates the hydrogen leak decision process at that time point. The third decision time $t_3$ is, for example, a time length of 9 to 15 seconds. When the flow rate total value $Q_3+Q_{err}$ does not converge to the threshold $Q_{th}$ or lower before the lapse of the third decision time $t_3$, the controller 90 decides that there is a hydrogen leak (NO at step S170a), and issues notification of occurrence of a hydrogen leak by means of warning display on an instrument panel or production of an alarm sound or the like (step S180a), then ending the hydrogen leak decision process. In addition, in issuing the notification at step S80a, the controller 90 may notify that the hydrogen leak is an internal leak; and in issuing the notification at step S180a, the controller 90 may notify that the hydrogen leak is an external leak.

B2. Effects

With occurrence of an internal leak, it may be conceived that the internal pressure of the hydrogen supply flow path increases. According to this embodiment, when there is a suspicion of an internal leak, the controller 90 decides the presence or absence of a hydrogen leak after the internal pressure of the hydrogen supply flow path 60 has been reduced to the second pressure value. Therefore, variations of pressure values used for the decision as to the presence or absence of a hydrogen leak can be enlarged, so that the hydrogen-leak decision accuracy can be improved.

With occurrence of an external leak, it may be conceived that the internal pressure of the hydrogen supply flow path 60 decreases. According to this embodiment, when there is a suspicion of an external leak, the controller 90 decides the presence or absence of a hydrogen leak after the internal pressurization of the hydrogen supply flow path 60 to the third pressure value. Therefore, variations of pressure values used for the hydrogen leak decision can be enlarged, so that the hydrogen-leak decision accuracy can be improved.

Also according to this embodiment, when it is decided after the pressurization process that there is no hydrogen leak, the pressure difference between the hydrogen tank 70 and the hydrogen supply flow path 60 has decreased as compared to before the pressurization process is executed. Therefore, noise produced by the pressure difference can be reduced to more extent during opening of the valve element 71 at a next start-up of the fuel cell.

Also according to this embodiment, when there is a suspicion of an external leak and the internal pressure of the hydrogen supply flow path 60 is lower than the third pressure value, the controller 90 makes the internal pressure of the hydrogen supply flow path 60 increased by pressurization. Thus, unnecessary pressurization inside the hydrogen supply flow path 60 can be suppressed.

Also according to this embodiment, since the third decision time $t_3$ is longer than the first decision time $t_1$, a variation of a pressure value at the third decision time $t_3$, with occurrence of a hydrogen leak, becomes larger than a variation of a pressure value at the first decision time $t_1$. Therefore, the hydrogen-leak decision accuracy after the pressurization to the third pressure value can be improved over the decision accuracy after the pressure reduction to the first pressure value. Moreover, when it is decided after the pressure reduction to the first pressure value that there is no suspicion of a hydrogen leak, the time length until the hydrogen leak decision is ended can be shortened.

Also according to this embodiment, since the decision as to an internal leak and/or an external leak can be executed regardless of the sensor errors and the size of an area targeted for the hydrogen leak decision, the decision accuracy can be improved. Therefore, since the extent of pressure reduction involved in the internal pressure reduction of the hydrogen supply flow path 60 to the first pressure value can be lessened, the pressure difference between the hydrogen tank 70 and the hydrogen supply flow path 60 can be lessened to more extent. Thus, when it is decided, after the pressure reduction to the first pressure value, that there is no suspicion of a hydrogen leak, noise produced by the pressure difference can be reduced to more extent during opening of the valve element at a next start-up of the fuel cell.

B3. Modification of Second Embodiment

In the second embodiment, on the basis that the pressure-value variation ΔP is positive, the controller 90 decides that a suspicion of a hydrogen leak is a suspicion of an internal leak. Instead, the controller 90 may decide so on the basis that a pressure value at a lapse of the first decision time $t_1$ has increased to over the first pressure value. Also, although the controller 90 decides, by the pressure-value variation ΔP being negative, that a suspicion of a hydrogen leak is a suspicion of an external leak, yet the controller 90 may decide so on the basis that a pressure value at a lapse of the first decision time $t_1$ has decreased to under the first pressure value. Furthermore, the controller 90 may decide whether a suspicion of a hydrogen leak is a suspicion of an internal leak or a suspicion of an external leak, depending on positivity or negativity of the flow rate Q which is calculated by using the pressure-value variation ΔP and which is expressed by the foregoing Equation (1).

In the second embodiment, when it is decided that a suspicion of a hydrogen leak is not a suspicion of an internal leak (FIG. 6; NO at step S40a), the controller 90 decides whether or not the internal pressure of the hydrogen supply flow path 60 is lower than the third pressure value (FIG. 7; step S110a). Instead of this, when it is decided that a suspicion of a hydrogen leak is not a suspicion of an internal leak, the controller 90 may execute the pressurization process while omitting the step of deciding whether or not the internal pressure of the hydrogen supply flow path 60 is lower than the third pressure value.

C. Third Embodiment

Figure 8:
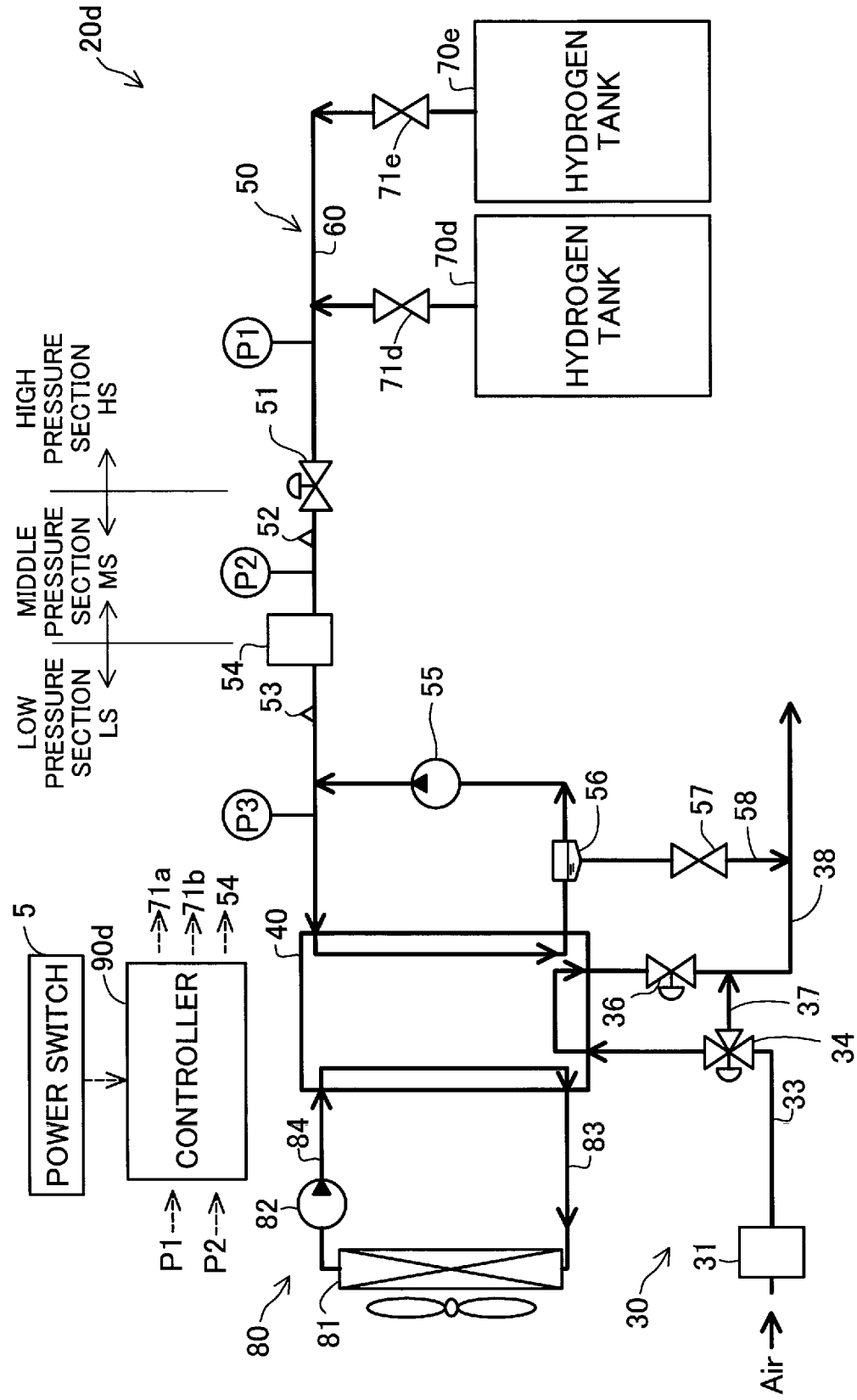
FIG. 8 is a diagram showing a schematic configuration of a fuel cell system in a third embodiment.

FIG. 8 is a diagram showing a schematic configuration of a fuel cell system 20d in a third embodiment. The fuel cell system 20d in this embodiment includes a plurality of hydrogen tanks 70d, 70e and a plurality of valve elements 71d, 71e. After making the decision as to the presence or absence of a hydrogen leak (FIG. 2; step S70) in the hydrogen leak decision process, a controller 90d opens one valve element 71d and subsequently the other valve element 71e at a next start-up of the fuel cell. In addition, the fuel cell system 20d may be provided with two or more hydrogen tanks 70e, and each hydrogen tank 70e may be provided with the valve element 71e. The rest of the configuration of the fuel cell system 20d is similar to that of the fuel cell system 20 of the foregoing embodiments, and so its description is omitted.

At the second pressure value in the hydrogen leak decision process, since the internal pressure of the hydrogen supply flow path 60 has been reduced to under the first pressure value, the pressure difference between the hydrogen tank 70 and the hydrogen supply flow path 60 is large, as compared to when it is decided at the first pressure value that there is no suspicion of a hydrogen leak. As a result, the noise produced at a next start-up of the fuel cell also becomes large. However, according to the fuel cell system 20d of this embodiment, one valve element 71d is opened, causing the pressure difference between the one hydrogen tank 70d and the interior of the hydrogen supply flow path 60 to decrease, and thereafter the other valve element 71e is opened. By virtue of this arrangement, noise produced by the pressure difference between the hydrogen tanks 70d, 70e and the interior of the hydrogen supply flow path 60 can be reduced, as compared to when the plurality of valve elements 71d, 71e are opened simultaneously.

D. Other Modifications

D1. Modification 1

The hydrogen leak decision process in the above-described various embodiments may be executed upon a power-generation halt of the fuel cell before the fuel cell system 20 is activated to start up the fuel cell. In addition, in a vehicle equipped with the fuel cell system 20, 20d, when the hydrogen leak decision process is executed after a halt of power generation by the fuel cell stack 40 with the power switch 5 turned off, delay of a power-generation start due to the hydrogen leak decision process can be suppressed while the decision accuracy is enhanced with the second decision time $t_2$ and the third decision time $t_3$ elongated.

D2. Modification 2

In the above-described various embodiments, the controller 90 decides the presence or absence of a hydrogen leak by absolute value of the hydrogen leak flow rate Q expressed by the foregoing Equation (1) with use of the pressure-value variation ΔP. Instead of this, the controller 90 may decide the presence or absence of a hydrogen leak depending on variations of pressure values. For example, the controller 90 may decide that there is a suspicion of a hydrogen leak when a pressure value acquired from the pressure sensor P1, P2 has increased to over the first pressure value after the pressure reduction to the first pressure value, and further may decide that there is a hydrogen leak when the pressure value has increased to over a value resulting from adding a sensor-error equivalent pressure value $P_{err}$ to the first pressure value. Moreover, the controller 90 may either decide that there is a hydrogen leak when a pressure value acquired from the pressure sensor P1, P2 has decreased to under the first pressure value after the pressure reduction to the first pressure value, or decide that there is a suspicion of a hydrogen leak when the pressure value has decreased to under a value resulting from subtracting the sensor-error equivalent pressure value $P_{err}$ from the first pressure value.

D3. Modification 3

In the above-described various embodiments, the controller 90 decides the presence or absence of a hydrogen leak by the absolute value of the hydrogen leak flow rate Q expressed by Equation (1) with use of the pressure-value variation ΔP. Instead of this, the controller 90 may decide the presence or absence of a hydrogen leak by the pressure-value variation ΔP without calculating the hydrogen leak flow rate Q.

Figure 9:
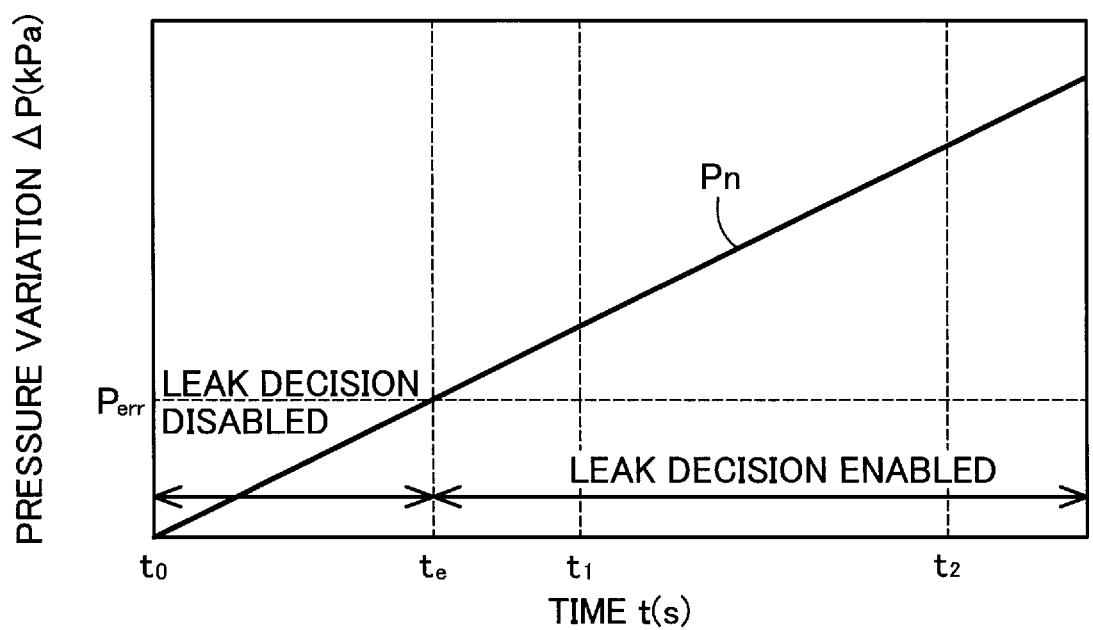
FIG. 9 is a chart showing a relationship between pressure-value variation and time.

FIG. 9 is a chart showing a relationship between pressure-value variation ΔP and time. FIG. 9 gives pressure-value variation ΔP in absolute value for convenience' sake. Also shown in FIG. 9 are absolute value of the sensor-error equivalent pressure value $P_{err}$ and a straight line Pn indicating the threshold for the pressure-value variation. For example, the controller 90 may either decide that there is no suspicion of a hydrogen leak when the pressure-value variation ΔP has come to the threshold or lower before a lapse of the first decision time $t_1$ subsequent to a lapse of time $t_e$ at the first pressure value (FIG. 2; YES at step S30), or decide that there is a suspicion of a hydrogen leak when the pressure-value variation ΔP has come to over the threshold (FIG. 2; NO at step S30).

D4. Modification 4

In the above-described embodiments, the pressure reducer for reducing the internal pressure of the hydrogen supply flow path 60 is the injector 54. Instead of this, the pressure reducer may be a valve provided on the hydrogen supply flow path 60, where the fuel cell system 20 may open the valve to reduce the internal pressure of the hydrogen supply flow path 60.

D5. Modification 5

In the above-described embodiments, the shutoff member provided on one side of the hydrogen supply flow path 60 closer to the fuel cell to shut off hydrogen supplied to the fuel cell is the injector 54. Instead of this, the shutoff member may be a valve provided in the hydrogen supply flow path 60, where the fuel cell system 20 may close the valve to shut off hydrogen supplied to the fuel cell stack 40.

D6. Modification 6

In the above-described embodiments, the controller 90 executes the hydrogen leak decision for the high pressure section HS and the middle pressure section MS. Instead of this, the controller 90 may execute the hydrogen leak decision for the hydrogen supply flow path 60 by closing the drain water shutoff valve 57 and by acquiring a pressure value of the low pressure section LS with the pressure sensor P3. In this case, the drain water shutoff valve 57 may be used as a pressure reducer. In this case, the controller 90 may execute the above-described various decisions by using a total value of variations of pressure values acquired from the pressure sensors P1, P2, P3.

D7. Modification 7

In the above-described embodiments, the second decision time $t_2$ and the third decision time $t_3$ are each longer than the first decision time $t_1$. Instead of this, the first decision time $t_1$ may be longer than the second decision time $t_2$ and the third decision time $t_3$.

The disclosure is not limited to any of the embodiment and its modifications described above but may be implemented by a diversity of other configurations without departing from the scope of the disclosure. Any of the technical features may be omitted appropriately unless the technical feature is described as essential herein. For example, the present disclosure may be implemented by any of aspects described below.

(1) According to one aspect of the disclosure, there is provided a fuel cell system. The fuel cell system include: a fuel cell; a hydrogen tank configured to store hydrogen therein; a hydrogen supply flow path configured to connect the hydrogen tank and the fuel cell to each other; a valve element configured to, when closed, shut off supply of hydrogen from the hydrogen tank to the hydrogen supply flow path; a pressure sensor for detecting an internal pressure value of the hydrogen supply flow path; a pressure reducer configured to reduce internal pressure of the hydrogen supply flow path; and a controller configured to decide presence or absence of a hydrogen leak in the fuel cell system upon a power-generation halt of the fuel cell, wherein the controller: while closing the valve element, reduces the internal pressure of the hydrogen supply flow path to a first pressure value by the pressure reducer; after the pressure reduction to the first pressure value, decides presence or absence of a suspicion of a hydrogen leak by using a variation of a pressure value acquired from the pressure sensor; when deciding that a suspicion of a hydrogen leak is presence, reduces the internal pressure of the hydrogen supply flow path to a second pressure value lower than the first pressure value by the pressure reducer; and after the pressure reduction to the second pressure value, decides the presence or absence of a hydrogen leak by using a variation of a pressure value acquired from the pressure sensor.

According to the above-described fuel cell system, when it is decided, after the internal pressure reduction of the hydrogen supply flow path to the first pressure value, that no suspicion of a hydrogen leak is presence, the pressure difference between the hydrogen tank and the interior of the hydrogen supply flow path becomes smaller than when the presence or absence of a hydrogen leak is decided after the internal pressure reduction of the hydrogen supply flow path to the second pressure value. Therefore, noise produced by the pressure difference can be reduced during opening of the valve element at a next start-up of the fuel cell.

(2) In the above-described aspect, the controller may: by using a variation of a pressure value acquired from the pressure sensor, decide whether the suspicion of a hydrogen leak is a suspicion of an internal leak which is a hydrogen leak from the valve element to the hydrogen supply flow path; and when deciding that the suspicion of a hydrogen leak is a suspicion of an internal leak, reduce the internal pressure value of the hydrogen supply flow path to the second pressure value by the pressure reducer.

With occurrence of an internal leak, it may be conceived that the internal pressure of the hydrogen supply flow path increases. According to this aspect, when a suspicion of an internal leak is presence, the presence or absence of a hydrogen leak is decided after the internal pressure reduction of the hydrogen supply flow path to the second pressure value. Therefore, a variation of a pressure value used for the decision as to the presence or absence of a hydrogen leak can be enlarged, so that the hydrogen-leak decision accuracy can be improved.

(3) In the above-described aspects, the controller may: decide the presence or absence of a suspicion of a hydrogen leak by using a variation of a pressure value acquired from the pressure sensor resulting over a time period from the internal pressure reduction of the hydrogen supply flow path to the first pressure value until a lapse of a first decision time; and decide the presence or absence of a hydrogen leak by using a variation of a pressure value acquired from the pressure sensor resulting over a time period from the internal pressure reduction of the hydrogen supply flow path to the second pressure value until a lapse of a second decision time longer than the first decision time.

According to this aspect, since the second decision time is longer than the first decision time, a variation of the pressure value at the second decision time, with occurrence of a hydrogen leak, becomes larger than a variation of the pressure value at the first decision time. Therefore, the hydrogen-leak decision accuracy after the internal pressure reduction of the hydrogen supply flow path to the second pressure value can be improved over the decision accuracy after the pressure reduction to the first pressure value. Moreover, when it is decided, after the pressure reduction to the first pressure value, that no suspicion of a hydrogen leak is presence, the time length until an end of the hydrogen leak decision can be shortened.

(4) In the above-described aspects, the controller may: decide that no suspicion of a hydrogen leak is presence when a sum value of a first hydrogen leak flow rate and a sensor error-equivalent flow rate has come to a predetermined value or lower before a lapse of the first decision time, the first hydrogen leak flow rate being calculated by using an absolute value of a variation of a pressure value acquired from the pressure sensor resulting over a time period having elapsed since the internal pressure reduction of the hydrogen supply flow path to the first pressure value as well as using a volume of the hydrogen supply flow path whose pressure value is detected by the pressure sensor, and the sensor error-equivalent flow rate being calculated by using an absolute value of a pressure value equivalent to an error of the pressure sensor as well as using the volume; decide that a suspicion of a hydrogen leak is presence when the sum value of the first hydrogen leak flow rate and the sensor error-equivalent flow rate has not come to the predetermined value or lower before a lapse of the first decision time; decide that no hydrogen leak is presence when a sum value of a second hydrogen leak flow rate and the sensor error-equivalent flow rate has come to the predetermined value or lower before a lapse of the second decision time, the second hydrogen leak flow rate being calculated by using an absolute value of a variation of a pressure value acquired from the pressure sensor resulting over a time period having elapsed since the internal pressure reduction of the hydrogen supply flow path to the second pressure value as well as using the volume; and decide that a hydrogen leak is presence when the sum value of the second hydrogen leak flow rate and the sensor error-equivalent flow rate has not come to the predetermined value or lower before a lapse of the second decision time.

According to this aspect, since the hydrogen leak decision can be executed regardless of sensor errors and the size of an area targeted for the hydrogen leak decision, the decision accuracy can be improved. Therefore, the extent of pressure reduction involved in the internal pressure reduction of the hydrogen supply flow path to the first pressure value can be lessened, so that the pressure difference between the hydrogen tank and the hydrogen supply flow path can be lessened to more extent. Thus, when it is decided, after the pressure reduction to the first pressure value, that there is no suspicion of a hydrogen leak, noise produced by the pressure difference can be reduced to more extent during opening of the valve element at a next start-up of the fuel cell.

(5) In the above-described aspects, the fuel cell system may further include a shutoff member provided on one side of the hydrogen supply flow path closer to the fuel cell than the pressure sensor and which is configured to serve for shutting off hydrogen supplied to the fuel cell, wherein the controller may decide the presence or absence of a hydrogen leak in part of the hydrogen supply flow path ranging from the hydrogen tank to the shutoff member.

According to this aspect, the hydrogen leak decision can be executed by eliminating the effects of cross leaks of hydrogen in the fuel cell, allowing decision accuracy to be improved. Therefore, since the extent of pressure reduction involved in the internal pressure reduction of the hydrogen supply flow path to the first pressure value can be lessened, the pressure difference between the hydrogen tank and the hydrogen supply flow path can be lessened to more extent. Thus, when it is decided, after the pressure reduction to the first pressure value, that no suspicion of a hydrogen leak is presence, noise produced by the difference can be reduced to more extent during opening of the valve element at a next start-up of the fuel cell.

(6) In the above-described aspects, the controller may: when deciding that a suspicion of a hydrogen leak is presence, decide whether the suspicion of a hydrogen leak is a suspicion of an internal leak or a suspicion of an external leak from the hydrogen supply flow path to exterior of the hydrogen supply flow path, by using positivity or negativity of a variation of a pressure value acquired from the pressure sensor; when deciding that the suspicion of a hydrogen leak is a suspicion of an external leak, execute a pressurization process for pressurizing the internal pressure of the hydrogen supply flow path to a third pressure value by opening the valve element; and after the pressurization process, decide whether the presence or absence of a hydrogen leak, by using a variation of a pressure value acquired from the pressure sensor.

With occurrence of an external leak, it may be conceived that the internal pressure of the hydrogen supply flow path decreases. According to this embodiment, when a suspicion of an external leak is presence, the presence or absence of a hydrogen leak is decided after the internal pressurization of the hydrogen supply flow path to the third pressure value. Therefore, a variation of a pressure value used for the hydrogen leak decision can be enlarged, so that the hydrogen-leak decision accuracy can be improved. Also, when it is decided after the pressurization process that there is no occurrence of a hydrogen leak, the pressure difference between the hydrogen tank and the hydrogen supply flow path has been reduced by the pressurization process as compared to before the pressurization process. Therefore, noise produced by the pressure difference can be reduced to more extent during opening of the valve element at a next start-up of the fuel cell.

(7) In the above-described aspects, the controller may: when deciding that the suspicion of a hydrogen leak is a suspicion of an external leak, decide whether or not a pressure value acquired from the pressure sensor is lower than the third pressure value; and execute the pressurization process when the pressure value is lower than the third pressure value.

According to this aspect, when a suspicion of an external leak is presence and the internal pressure of the hydrogen supply flow path is lower than the third pressure value, the pressurization process is executed. Thus, unnecessary internal pressurization of the hydrogen supply flow path can be suppressed.

(8) In the above-described aspects, the controller may: decide the presence or absence of a suspicion of a hydrogen leak, by using a variation of a pressure value acquired from the pressure sensor resulting over a time period from the internal pressure reduction of the hydrogen supply flow path to the first pressure value until a lapse of the first decision time; and decide the presence or absence of a hydrogen leak, by using a variation of a pressure value acquired from the pressure sensor resulting over a time period from the internal pressurization of the hydrogen supply flow path to the third pressure value until a lapse of a third decision time longer than the first decision time.

According to this aspect, since the third decision time is longer than the first decision time, a variation of a pressure value at the third decision time, with occurrence of a hydrogen leak, becomes larger than a variation of a pressure value at the first decision time. Therefore, the hydrogen-leak decision accuracy after the internal pressurization of the hydrogen supply flow path to the third pressure value can be improved to more extent over the decision accuracy after the pressure reduction to the first pressure value. Moreover, when it is decided after the pressure reduction to the first pressure value that no suspicion of a hydrogen leak is presence, the time length until an end of the hydrogen leak decision can be shortened.

(9) In the above-described aspects, the controller may: decide that no suspicion of a hydrogen leak is presence when a sum value of a first hydrogen leak flow rate and a sensor error-equivalent flow rate has come to a predetermined value or lower before a lapse of the first decision time, the first hydrogen leak flow rate being calculated by using an absolute value of a variation of a pressure value acquired from the pressure sensor resulting over a time period having elapsed since the internal pressure reduction of the hydrogen supply flow path to the first pressure value as well as using a volume of the hydrogen supply flow path whose pressure value is detected by the pressure sensor, and the sensor error-equivalent flow rate being calculated by using an absolute value of a pressure value equivalent to an error of the pressure sensor as well as using the volume; decide that a suspicion of a hydrogen leak is presence when the sum value of the first hydrogen leak flow rate and the sensor error-equivalent flow rate has not come to the predetermined value or lower before a lapse of the first decision time; decide that no hydrogen leak is presence when a sum value of a third hydrogen leak flow rate and the sensor error-equivalent flow rate has come to the predetermined value or lower before a lapse of the third decision time, the third hydrogen leak flow rate being calculated by using an absolute value of a variation of a pressure value acquired from the pressure sensor resulting over a time period having elapsed since the internal pressurization of the hydrogen supply flow path to the third pressure value as well as using the volume; and decide that a hydrogen leak is presence when the sum value of the third hydrogen leak flow rate and the sensor error-equivalent flow rate has not come to the predetermined value or lower.

According to this aspect, since the hydrogen leak decision can be executed regardless of sensor errors and the size of an area targeted for the hydrogen leak decision, the decision accuracy can be improved. Therefore, the extent of pressure reduction involved in the internal pressure reduction of the hydrogen supply flow path to the first pressure value can be lessened, so that the pressure difference between the hydrogen tank and the hydrogen supply flow path can be lessened to more extent. Thus, when it is decided, after the pressure reduction to the first pressure value, that no suspicion of a hydrogen leak is presence, noise produced by the pressure difference can be reduced to more extent during opening of the valve element at a next start-up of the fuel cell.

(10) In the above-described aspects, the fuel cell system may further include a plurality of the hydrogen tanks, and a plurality of the valve elements for shutting off supply of hydrogen from the plurality of hydrogen tanks, respectively, to the hydrogen supply flow path, wherein at a start-up of the fuel cell subsequent to execution of the decision as to the presence or absence of a hydrogen leak, the controller may open one valve element out of the plurality of valve elements and thereafter open another of the valve elements.

After the pressure reduction to the second pressure value with a decision that a suspicion of a hydrogen leak is presence, the pressure difference between the hydrogen tank and the hydrogen supply flow path is large, as compared to when it is decided at the first pressure value that no suspicion of a hydrogen leak is presence. As a result, the noise produced at a next start-up of the fuel cell also becomes large. However, according to this aspect, after the pressure difference between the one hydrogen tank and the interior of the hydrogen supply flow path has been decreased by one valve element being opened, another valve element is opened. By virtue of this arrangement, noise produced by the pressure difference between the hydrogen tank and the interior of the hydrogen supply flow path can be reduced, as compared to when the plurality of valve elements are opened simultaneously.

The disclosure may also be implemented in various aspects other than the above-described fuel cell systems. For example, the disclosure may be implemented in aspects such as hydrogen leak decision methods by the fuel cell system, computer programs for implementing those methods, non-temporary storage mediums having those computer programs stored therein, and the like.

What is claimed is:
1. A fuel cell system comprising:
a fuel cell;
a hydrogen tank configured to store hydrogen therein;
a hydrogen supply flow path configured to connect the hydrogen tank and the fuel cell to each other;
a valve element configured to, when closed, shut off supply of hydrogen from the hydrogen tank to the hydrogen supply flow path;
a pressure sensor for detecting an internal pressure value of the hydrogen supply flow path;
a pressure reducer configured to reduce internal pressure of the hydrogen supply flow path; and
a controller configured to decide presence or absence of a hydrogen leak in the fuel cell system upon a power-generation halt of the fuel cell, wherein
the controller:
while closing the valve element, reduces the internal pressure of the hydrogen supply flow path to a first pressure value by the pressure reducer;
after the pressure reduction to the first pressure value, decides presence or absence of a suspicion of a hydrogen leak by using a variation of a pressure value acquired from the pressure sensor;
when deciding that a suspicion of a hydrogen leak is presence, reduces the internal pressure of the hydrogen supply flow path to a second pressure value lower than the first pressure value by the pressure reducer; and after the pressure reduction to the second pressure value, decides the presence or absence of a hydrogen leak by using a variation of a pressure value acquired from the pressure sensor.

2. The fuel cell system in accordance with claim 1, wherein the controller:

by using a variation of a pressure value acquired from the pressure sensor, decides whether the suspicion of a hydrogen leak is a suspicion of an internal leak which is a hydrogen leak from the valve element to the hydrogen supply flow path; and when deciding that the suspicion of a hydrogen leak is the suspicion of an internal leak, reduces the internal pressure value of the hydrogen supply flow path to the second pressure value.

3. The fuel cell system in accordance with claim 1, wherein the controller:

decides the presence or absence of a suspicion of a hydrogen leak by using a variation of a pressure value acquired from the pressure sensor resulting over a time period from the internal pressure reduction of the hydrogen supply flow path to the first pressure value until a lapse of a first decision time; and decides the presence or absence of a hydrogen leak by using a variation of a pressure value acquired from the pressure sensor resulting over a time period from the internal pressure reduction of the hydrogen supply flow path to the second pressure value until a lapse of a second decision time longer than the first decision time.

4. The fuel cell system in accordance with claim 3, wherein the controller decides that no suspicion of a hydrogen leak is presence when a sum value of a first hydrogen leak flow rate and a sensor error-equivalent flow rate has come to a predetermined value or lower before a lapse of the first decision time, the first hydrogen leak flow rate being calculated by using an absolute value of a variation of a pressure value acquired from the pressure sensor resulting over a time period having elapsed since the internal pressure reduction of the hydrogen supply flow path to the first pressure value as well as using a volume of the hydrogen supply flow path whose pressure value is detected by the pressure sensor, and the sensor error-equivalent flow rate being calculated by using an absolute value of a pressure value equivalent to an error of the pressure sensor as well as using the volume;

the controller decides that a suspicion of a hydrogen leak is presence when the sum value of the first hydrogen leak flow rate and the sensor error-equivalent flow rate has not come to the predetermined value or lower before a lapse of the first decision time;

the controller decides that no hydrogen leak is presence when a sum value of a second hydrogen leak flow rate and the sensor error-equivalent flow rate has come to the predetermined value or lower before a lapse of the second decision time, the second hydrogen leak flow rate being calculated by using an absolute value of a variation of a pressure value acquired from the pressure sensor resulting over a time period having elapsed since the internal pressure reduction of the hydrogen supply flow path to the second pressure value as well as using the volume; and the controller decides that a hydrogen leak is presence when the sum value of the second hydrogen leak flow rate and the sensor error-equivalent flow rate has not come to the predetermined value or lower before a lapse of the second decision time.

5. The fuel cell system in accordance with claim 1, further comprising:

a shutoff member provided on one side of the hydrogen supply flow path closer to the fuel cell than the pressure sensor and which is configured to serve for shutting off hydrogen supplied to the fuel cell, wherein the controller decides the presence or absence of a hydrogen leak in part of the hydrogen supply flow path ranging from the hydrogen tank to the shutoff member.

6. The fuel cell system in accordance with claim 2, wherein when the controller decides that a suspicion of a hydrogen leak is presence, the controller decides whether the suspicion of a hydrogen leak is a suspicion of an internal leak or a suspicion of an external leak from the hydrogen supply flow path to exterior of the hydrogen supply flow path, by using positivity or negativity of a variation of a pressure value acquired from the pressure sensor;

when the controller decides that the suspicion of a hydrogen leak is the suspicion of an external leak, the controller executes a pressurization process for pressurizing the internal pressure of the hydrogen supply flow path to a third pressure value by opening the valve element; and after the pressurization process, the controller decides whether the presence or absence of a hydrogen leak, by using a variation of a pressure value acquired from the pressure sensor.

7. The fuel cell system in accordance with claim 6, wherein the controller:

when deciding that the suspicion of a hydrogen leak is a suspicion of an external leak, decides whether a pressure value acquired from the pressure sensor is lower than the third pressure value; and executes the pressurization process when the pressure value is lower than the third pressure value.

8. The fuel cell system in accordance with claim 6, wherein the controller:

decides the presence or absence of a suspicion of a hydrogen leak, by using a variation of a pressure value acquired from the pressure sensor resulting over a time period from the internal pressure reduction of the hydrogen supply flow path to the first pressure value until a lapse of the first decision time; and decides the presence or absence of a hydrogen leak, by using a variation of a pressure value acquired from the pressure sensor resulting over a time period from the internal pressurization of the hydrogen supply flow path to the third pressure value until a lapse of a third decision time longer than the first decision time.

9. The fuel cell system in accordance with claim 8, wherein the controller decides that no suspicion of a hydrogen leak is presence when a sum value of a first hydrogen leak flow rate and a sensor error-equivalent flow rate has come to a predetermined value or lower before a lapse of the first decision time, the first hydrogen leak flow rate being calculated by using an absolute value of a variation of a pressure value acquired from the pressure sensor resulting over a time period having elapsed since the internal pressure reduction of the hydrogen supply flow path to the first pressure value as well as using a volume of the hydrogen supply flow path whose pressure value is detected by the pressure sensor, and the sensor error-equivalent flow rate being calculated by using an absolute value of a pressure value equivalent to an error of the pressure sensor as well as using the volume;

the controller decides that a suspicion of a hydrogen leak is presence when the sum value of the first hydrogen leak flow rate and the sensor error-equivalent flow rate has not come to the predetermined value or lower before a lapse of the first decision time;

the controller decides that no hydrogen leak is presence when a sum value of a third hydrogen leak flow rate and the sensor error-equivalent flow rate has come to the predetermined value or lower before a lapse of the third decision time, the third hydrogen leak flow rate being calculated by using an absolute value of a variation of a pressure value acquired from the pressure sensor resulting over a time period having elapsed since the internal pressurization of the hydrogen supply flow path to the third pressure value as well as using the volume; and the controller decides that a hydrogen leak is presence when the sum value of the third hydrogen leak flow rate and the sensor error-equivalent flow rate has not come to the predetermined value or lower.

10. The fuel cell system in accordance with claim 1, further comprising
a plurality of the hydrogen tanks, and a plurality of the valve elements for shutting off supply of hydrogen from the plurality of hydrogen tanks, respectively, to the hydrogen supply flow path, wherein
at a start-up of the fuel cell subsequent to execution of the decision as to the presence or absence of a hydrogen leak, the controller opens one valve element out of the plurality of valve elements and thereafter opens another of the valve elements.

11. A hydrogen leak decision method in a fuel cell system including a fuel cell, comprising:
upon a power-generation halt of the fuel cell,
while closing a valve element of a hydrogen tank in which hydrogen is stored, reducing internal pressure of a hydrogen supply flow path to a first pressure value, the hydrogen supply flow path connecting the hydrogen tank and the fuel cell to each other;
after the pressure reduction to the first pressure value, deciding presence or absence of a suspicion of a hydrogen leak by using a variation of an internal pressure value of the hydrogen supply flow path;
when deciding that a suspicion of a hydrogen leak is presence, reducing the internal pressure of the hydrogen supply flow path to a second pressure value lower than the first pressure value; and
after the pressure reduction to the second pressure value, deciding the presence or absence of a hydrogen leak by using a variation of an internal pressure of the hydrogen supply flow path.

12. The hydrogen leak decision method in accordance with claim 11, further comprising:
by using a variation of an internal pressure value of the hydrogen supply flow path, deciding whether or not the suspicion of a hydrogen leak is a suspicion of an internal leak which is a hydrogen leak from the valve element to the hydrogen supply flow path; and
when deciding that the suspicion of a hydrogen leak is a suspicion of an internal leak, reducing the internal pressure value of the hydrogen supply flow path to the second pressure value.

13. The hydrogen leak decision method in accordance with claim 11, further comprising:
deciding the presence or absence of a suspicion of a hydrogen leak by using a variation of an internal pressure value of the hydrogen supply flow path resulting over a time period from the internal pressure reduction of the hydrogen supply flow path to the first pressure value until a lapse of the first decision time; and
deciding the presence or absence of a hydrogen leak by using a variation of an internal pressure of the hydrogen supply flow path resulting over a time period from the internal pressure reduction of the hydrogen supply flow path to the second pressure value until a lapse of a second decision time longer than the first decision time.

14. The hydrogen leak decision method in accordance with claim 13, further comprising:
deciding that no suspicion of a hydrogen leak is presence when a sum value of a first hydrogen leak flow rate and an error-equivalent flow rate has come to a predetermined value or lower before a lapse of the first decision time, the first hydrogen leak flow rate being calculated by using an absolute value of a variation of an internal pressure value of the hydrogen supply flow path resulting over a time period having elapsed since the internal pressure reduction of the hydrogen supply flow path to the first pressure value as well as using a volume of the hydrogen supply flow path, and the error-equivalent flow rate being calculated by using an absolute value of a pressure value equivalent to a detection error of an internal pressure value of the hydrogen supply flow path as well as using the volume;
deciding that a suspicion of a hydrogen leak is presence when the sum value of the first hydrogen leak flow rate and the error-equivalent flow rate has not come to the predetermined value or lower before a lapse of the first decision time;
deciding that no hydrogen leak is presence when a sum value of a second hydrogen leak flow rate and the error-equivalent flow rate has come to the predetermined value or lower before a lapse of the second decision time, the second hydrogen leak flow rate being calculated by using an absolute value of a variation of an internal pressure value of the hydrogen supply flow path resulting over a time period having elapsed since the internal pressure reduction of the hydrogen supply flow path to the second pressure value as well as using the volume; and
deciding that a hydrogen leak is presence when the sum value of the second hydrogen leak flow rate and the error-equivalent flow rate has not come to the predetermined value or lower before a lapse of the second decision time.

15. The hydrogen leak decision method in accordance with claim 12, further comprising:
when deciding that a suspicion of a hydrogen leak is presence, deciding whether the suspicion of a hydrogen leak is a suspicion of an internal leak or a suspicion of the external leak from the hydrogen supply flow path to exterior of the hydrogen supply flow path, by using positivity or negativity of a variation of an internal pressure value of the hydrogen supply flow path;
when deciding that the suspicion of a hydrogen leak is a suspicion of an external leak, executing a pressurization process for pressurizing the internal pressure of the hydrogen supply flow path to a third pressure value by opening the valve element; and after the pressurization process, deciding the presence or absence of a hydrogen leak, by using a variation of an internal pressure value of the hydrogen supply flow path.

16. The hydrogen leak decision method in accordance with claim 15, further comprising:
when deciding that the suspicion of a hydrogen leak is a suspicion of an external leak, deciding whether or not an internal pressure value of the hydrogen supply flow path is lower than the third pressure value; and
when deciding that the internal pressure value is lower than the third pressure value, executing the pressurization process.

17. The hydrogen leak decision method in accordance with claim 15, further comprising:
deciding the presence or absence of a suspicion of a hydrogen leak, by using a variation of an internal pressure value of the hydrogen supply flow path resulting over a time period from the internal pressure reduction of the hydrogen supply flow path to the first pressure value until a lapse of a first decision time; and
deciding the presence or absence of a hydrogen leak by using a variation of the internal pressure value of the hydrogen supply flow path resulting over a time period from the internal pressurization of the hydrogen supply flow path to the third pressure value until a lapse of a third decision time longer than the first decision time.

18. The hydrogen leak decision method in accordance with claim 17, further comprising:
deciding that no suspicion of a hydrogen leak is presence when a sum value of a first hydrogen leak flow rate and an error-equivalent flow rate has come to a predetermined value or lower before a lapse of the first decision time, the first hydrogen leak flow rate being calculated by using an absolute value of a variation of an internal pressure value of the hydrogen supply flow path resulting over a time period having elapsed since the internal pressure reduction of the hydrogen supply flow path to the first pressure value as well as using a volume of the hydrogen supply flow path, and the error-equivalent flow rate being calculated by using an absolute value of a pressure value equivalent to a detection error of an internal pressure value of the hydrogen supply flow path as well as using the volume;
deciding that a suspicion of a hydrogen leak is presence when the sum value of the first hydrogen leak flow rate and the error-equivalent flow rate has not come to the predetermined value or lower before a lapse of the first decision time;
deciding that no hydrogen leak is presence when a sum value of a third hydrogen leak flow rate and the error-equivalent flow rate has come to the predetermined value or lower before a lapse of the third decision time, the third hydrogen leak flow rate being calculated by using an absolute value of a variation of an internal pressure value of the hydrogen supply flow path resulting over a time period having elapsed since the internal pressurization of the hydrogen supply flow path to the third pressure value as well as using the volume; and
deciding that a hydrogen leak is presence when the sum value of the third hydrogen leak flow rate and the error-equivalent flow rate has not come to the predetermined value or lower.

19. The hydrogen leak decision method in accordance with claim 11, wherein
the fuel cell system includes a plurality of the hydrogen tanks, and a plurality of the valve elements configured to shut off supply of hydrogen from the plurality of hydrogen tanks, respectively, to the hydrogen supply flow path, the method further comprising
at a start-up of the fuel cell subsequent to execution of the decision as to the presence or absence of a hydrogen leak, opening one valve element out of the plurality of valve elements and thereafter opens another of the valve elements.

* * * * *